United States Patent
Duhaime et al.

(10) Patent No.: US 10,146,957 B1
(45) Date of Patent: *Dec. 4, 2018

(54) SENSITIVE DATA ALIASING

(71) Applicant: VERISK CRIME ANALYTICS, INC., Jersey City, NJ (US)

(72) Inventors: David A. Duhaime, Eden Prairie, MN (US); Brad J. Duhaime, Maple Grove, MN (US)

(73) Assignee: Verisk Crime Analytics, Inc., Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/838,092

(22) Filed: Dec. 11, 2017

Related U.S. Application Data

(60) Continuation of application No. 15/271,970, filed on Sep. 21, 2016, now Pat. No. 9,875,376, which is a continuation of application No. 14/843,081, filed on Sep. 2, 2015, now Pat. No. 9,460,298, which is a division of application No. 14/622,426, filed on Feb. 13, 2015, now abandoned, which is a continuation of application No. 14/033,657, filed on Sep. 23, 2013, now Pat. No. 8,984,656, which is a continuation of application No. 13/472,279, filed on May 15, 2012, now Pat. No. 8,544,110, which is a continuation of application No. 12/978,727, filed on Dec. 27, 2010, now Pat. No. 8,209,764, which is a continuation of (Continued)

(51) Int. Cl.
*H04L 9/00* (2006.01)
*G06F 21/62* (2013.01)
*G06F 17/30* (2006.01)
*H04L 9/06* (2006.01)
*G06F 21/60* (2013.01)
*G06Q 20/34* (2012.01)
*G06Q 20/38* (2012.01)
*G06F 21/32* (2013.01)

(52) U.S. Cl.
CPC .... *G06F 21/6245* (2013.01); *G06F 17/30082* (2013.01); *G06F 21/32* (2013.01); *G06F 21/602* (2013.01); *G06F 21/6227* (2013.01); *G06Q 20/356* (2013.01); *G06Q 20/383* (2013.01); *H04L 9/0625* (2013.01); *H04L 9/0631* (2013.01); *H04L 9/0643* (2013.01); *G06F 2221/2101* (2013.01)

(58) Field of Classification Search
CPC ...................................................... H04L 61/30
See application file for complete search history.

(56) References Cited

U.S. PATENT DOCUMENTS 6,140,941 A   10/2000  Dwyer et al.
6,260,757 B1   7/2001  Strisower (Continued)

OTHER PUBLICATIONS

B. Liver et al. "Privacy in Service Oriented Architecture." Feb. 4, 2011. 12th IEEE International Conference on Commerce and Enterprise Computing.

*Primary Examiner* — Josnel Jeudy
(74) *Attorney, Agent, or Firm* — Crawford Maunu PLLC

(57) ABSTRACT

Database management and security is implemented in a variety of embodiments. In one such embodiment, data sets containing sensitive data elements are analyzed using aliases representing sensitive data elements. In another embodiment, the sensitive data elements are stored in an encrypted form for use from a secure access, while the alias is available for standard access.

15 Claims, 4 Drawing Sheets

Related U.S. Application Data application No. 11/372,750, filed on Mar. 10, 2006, now Pat. No. 7,870,614.

(60) Provisional application No. 60/763,048, filed on Jan. 27, 2006.

(56) References Cited

U.S. PATENT DOCUMENTS

| | | |
|---|---|---|
| 6,681,195 B1 | 1/2004 | Poland et al. |
| 6,847,393 B2 | 1/2005 | Ashe et al. |
| 7,213,748 B2 | 5/2007 | Tsuei et al. |
| 7,275,685 B2 | 10/2007 | Gray et al. |
| 7,395,436 B1 | 7/2008 | Nemovicher |
| 7,814,554 B1 | 10/2010 | Ragner |
| 7,870,614 B1 | 1/2011 | Duhaime et al. |
| 7,873,577 B1 | 1/2011 | Duhaime et al. |
| 8,209,764 B2 | 6/2012 | Duhaime et al. |
| 8,473,418 B2 | 6/2013 | Duhaime et al. |
| 8,544,110 B2 | 9/2013 | Duhaime et al. |
| 8,984,656 B1 | 3/2015 | Duhaime et al. |
| 9,460,298 B1 | 10/2016 | Duhaime et al. |
| 2002/0083320 A1 | 6/2002 | Vatanen |
| 2003/0093683 A1 | 5/2003 | Wong et al. |
| 2004/0069845 A1 | 4/2004 | Goldstein et al. |
| 2004/0155960 A1 | 8/2004 | Wren et al. |
| 2005/0035192 A1 | 2/2005 | Bonalle et al. |
| 2007/0028072 A1 | 2/2007 | Hennessy et al. |
| 2007/0169202 A1 | 7/2007 | Goldberg et al. |
| 2008/0048025 A1 | 2/2008 | Fitzgerald et al. |
| 2008/0148373 A1* | 6/2008 | Adams .................... G06F 21/31 726/6 |
| 2009/0119194 A1 | 5/2009 | Chau et al. |

* cited by examiner

SENSITIVE DATA ALIASING

FIELD OF THE INVENTION

The present invention relates generally to approaches to database management, and more particularly, to a sensitive data aliasing procedure that facilitates implementing sensitive databases.

BACKGROUND

Databases are used for a large number of different applications. In some instances, the databases can be used to store sensitive information that calls for a measure of security. Depending upon the importance of the information and the potential for misuse of the information, different levels of security are implemented. Several different types of sensitive information that typically require a high level of security include transaction card account identifiers, account numbers, social security numbers, and more.

Many applications exist that utilize databases containing sensitive data and information related to sensitive data. The applications serve a variety of purposes, including statistical analysis, record keeping, Internet access, and other uses. Some types of sensitive data relate to personal identification data, such as social-security numbers, driver license numbers, private cell phone numbers, account numbers or biometric data identification. Other types of sensitive data may be related to private information, such as medical records, financial statements or other information. These and other types of data are often useful for statistical analysis, record-keeping, and other data-management uses. When using the sensitive data, many data-management applications store the sensitive data in a database. If an unauthorized person were to gain access to the database, they could use the stored information to commit fraud, identity theft, or other illegal activities. For this reason, sufficient security measures are required to prevent unauthorized access to a database containing sensitive information.

There has been a growing concern, however, in the prevention of unauthorized access to such databases. A person who gains such an unauthorized access could commit fraud, identity theft, or other illegal activities with any of the sensitive information. In addition, the capacity for transaction card fraud has increased with the growing use of the Internet. If databases are accessible from a system that has a link to the Internet, the potential security issues increase because an unauthorized person may be able to access the database from a distant location. Accordingly, databases that contain transaction card information often implement costly security measures to prevent transaction card fraud.

Examples of security measures used include implementing a firewall or a similar method of limiting external access, password protecting the database, limiting the amount of sensitive information stored, encrypting the sensitive information, and masking the display of the sensitive information.

Several of the security measures can adversely affect the functionality of the database. For example, limiting the amount of sensitive information stored often can be accomplished by retaining the sensitive information for a limited period of time (e.g., only storing sensitive information less than a month old); however, an application may have a need for accessing information related to events that occurred prior to the limited time period. In another example, the sensitive data can be encrypted in the database using an encryption method, such as AES (Advanced Encryption Standard) cryptography or a similar method. Unfortunately, after a sensitive data element is encrypted by such methods, the encrypted result is often a large binary string, and thus, contains characters that cannot be displayed and that can be difficult to store and manipulate because of the encrypted format. Moreover, database transactions involving the encrypted data can require large amounts of computing power and time, and can produce erroneous data that in various applications can cause the applications to function incorrectly. In addition, many encryption methods use a key to create the encrypted data. If the key is changed, all of the encrypted data must also be changed. This can create compatibility issues between the old and new encrypted values.

When the sensitive data is masked for display purposes (e.g., replaced with "*" or other unrelated markers), masking the information can reduce the usefulness of the display. For example, a viewer is not able to look through a listing of data for identical sensitive data identifiers if the identifiers are masked. Moreover, if partial masking of the identifiers is used, the uniqueness of each sensitive data element may be lost.

These and other issues have presented challenges to the implementation of secure databases, including those involving sensitive information.

SUMMARY

The claimed invention is directed to overcoming some of the aforementioned challenges and others related to the storage and utilization of sensitive information. The present invention is exemplified in a number of implementations and applications, some of which are summarized below.

Various example embodiments of the present invention are directed to the facilitation of the creation and utilization of secure databases.

According to an example embodiment of the present invention, a method is employed for facilitating the storage and use of sensitive data. After the sensitive data is received, it is encrypted using an acceptable encryption technique. The format of the encrypted data is modified to facilitate storage, manipulation, or viewing of the data. The formatted data is stored in a database. Aliases (e.g., alphanumeric and other representations) are assigned to represent the sensitive information in the database, and for many database accesses, the aliases are used in place of the sensitive information.

According to another example embodiment of the present invention, a system is arranged to facilitate the storage and utilization of sensitive data elements. The system receives the sensitive data elements along with other data associated with the sensitive data. The system uses software or hardware encryption techniques to encrypt the sensitive data elements. A database stores the encrypted sensitive data elements once the encrypted sensitive data elements are formatted in accordance with the database requirements. The system creates an alias corresponding to each formatted sensitive data element. The alias is provided in place of the sensitive data element for certain types of access requests.

Another embodiment uses data sets associated with sensitive data elements for statistical analysis. The system associates encrypted forms of the sensitive data elements to aliases, and uses or provides the aliases for analyzing aspects of the data sets independent of both encrypted and unencrypted forms of the sensitive data elements.

In another embodiment of the present invention, a system is coded at compile time with a unique identifier for each customer. The system uses the unique identifier to generate an encryption key from a pass phrase entered by the customer. This method allows for two different customers to have the same pass phrase but still have a different encryption scheme. The software application can then use the encryption key to encrypt the sensitive data elements.

According to another example embodiment, the user can select a user identification and password for access to the database. The user identification and password are saved in an encrypted file and transferred to a third party. The third party can use the encrypted file to provide the secure access settings of the database during, for example, installation of a database management system. Alternatively, the third party may use the encrypted file after installation to modify the secure access settings of the database. The system then uses the user identification and password to access the database.

Another embodiment generates a hash value for the encrypted sensitive data. The system can subsequently use the hash value for database processing, such as data searching or sorting.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
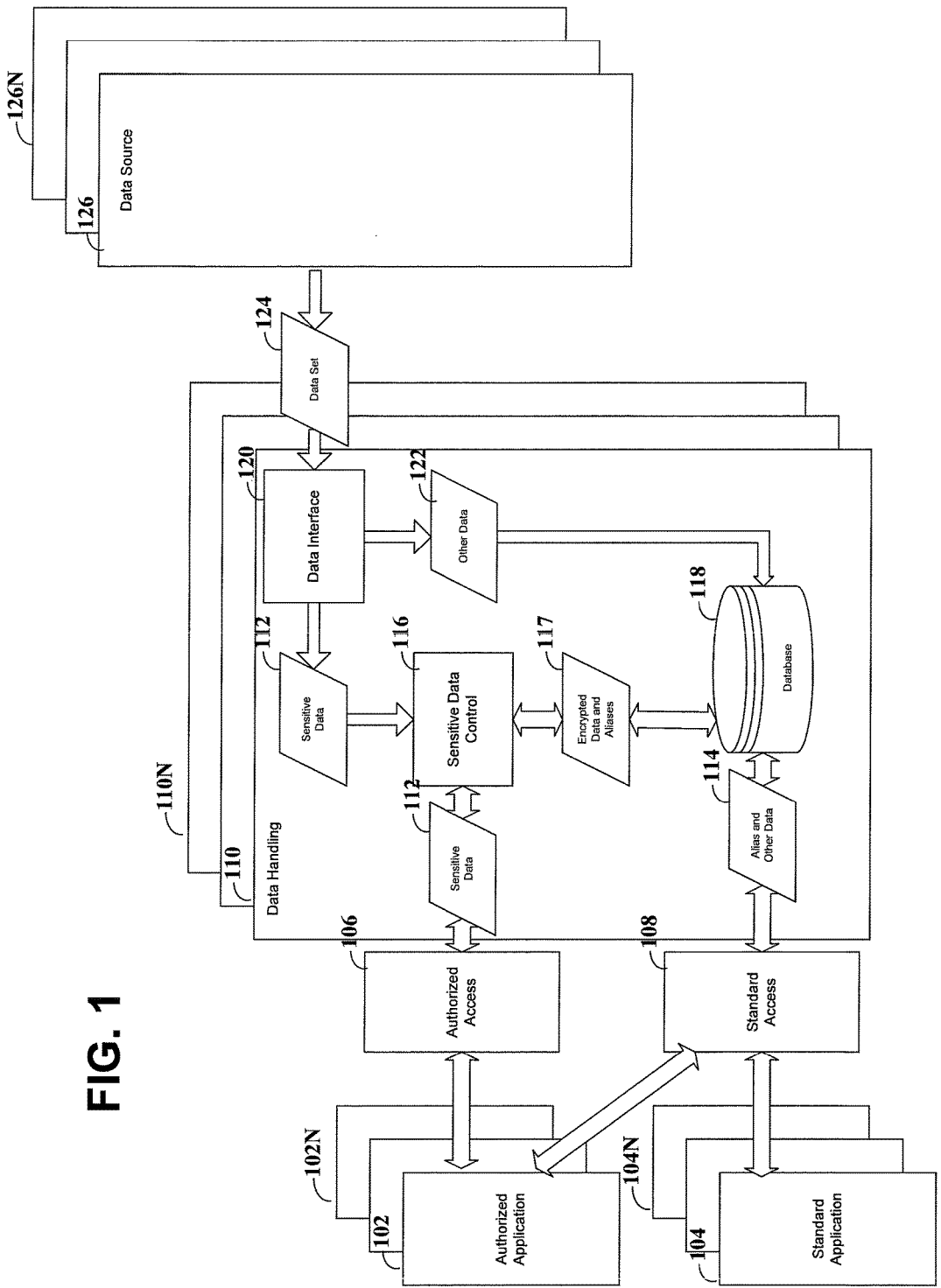
FIG. 1 is an arrangement for storage and utilization of sensitive data, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be useful for a variety of different applications, and the invention has been found to be particularly suited for use with the management of databases containing sensitive data elements, such as credit/debit card account numbers and related information. While the present invention is not necessarily limited to such applications, various aspects of the invention may be appreciated through a discussion of various examples using this context.

One embodiment uses data sets associated with such sensitive data elements that require access restrictions. For example, the sensitive data may represent a personal identification number. The person associated with the identification number has an expectation that the identification number will be kept confidential. With this expectation, the person may supply the identification number, or it may be obtained from another source. The identification number, along with any other relevant data, is stored for analysis or recordkeeping purposes. In accordance with the present invention, the person's expectation of confidentiality can be satisfied while still permitting limited use of the stored information. A computer, electronic circuit or similar method generates an independent alias identifier and associates the alias identifier to the identification number. Other applications are able to more freely use this alias identifier because the alias is independent of the identification number (i.e., not invertible to the identification number). For example, a statistical analysis may be run for medical purposes using aliases in place of social security numbers without risk of the social security number being fraudulently derived solely from the alias identifier. For security purposes, the identification number is encrypted and access to the encrypted sensitive data identifier can be restricted.

In another embodiment, a computer-based input provides sensitive data for storage in a database. The system first encrypts the sensitive data using a suitable encryption scheme. Examples of encryption schemes that can be used include, but are not limited to, AES, Data Encryption Standard (DES), and International Data Encryption Algorithm (IDEA). For example, many encryption schemes generate a binary string that can be difficult to read, remember, and store. In one embodiment, the binary string can be converted to a readable form using uuencode, base64, or similar conversion methods. The system stores the formatted data in a database, creates an alias identifier and associates an alias to each piece of formatted data. The system may maintain the association between the alias and the formatted data, regardless of the form of the sensitive data. Thus, the association remains the same whether the data is decrypted, formatted, encrypted or re-encrypted using a different encryption scheme.

An output of the system provides the alias identifier in place of the formatted data for access to the database unless the sensitive data is specifically requested by an authorized user. The alias identifiers are independent of the sensitive data in that the sensitive data cannot be derived directly from the alias identifiers. This independence can be implemented using a variety of alias identifier creation techniques such as a randomly generated identifier, a sequentially generated identifier, or a non-invertible derivation of the sensitive data identifier. The aliases may also be uniquely associated with exactly one sensitive data identifier. In some instances, the user, administrator, or another application using the invention may configure the format of the alias identifiers. For example, the user may designate that the alias identifiers should be formatted to each contain six capital letters or to each contain nine digits (the numbers "6" and "9" being merely illustrative). In another embodiment, the user may designate a portion of the sensitive data that is retained and used as a portion of the alias identifier. In one such example, the system uses the first number of a sensitive data identifier as the first number of its corresponding alias.

Access to the database can be performed using various methods; for example, a graphical user interface (GUI) can be generated allowing users to request and receive data. In one embodiment, each user of the system is assigned a user identification and password to verify their identity. The system can be configured to record configuration information related to each user, and the GUI may be tailored to the user once they have successfully provided their user identification (user ID) and password. Other secure access methods can be implemented, such as verifying that the computer accessing the database is authenticated with the local system, verifying that the user logged into the computer has authorization to access the database (e.g., using Microsoft Windows® integrated authentication), implementing a restriction on the number of invalid verification attempts for a user ID, or requiring complex passwords that must be changed periodically. In addition, the GUI interface can be configured to provide access to multiple databases, each having unique access privileges. Upon a finding that any of the variables entered (e.g., server, database name, user ID, or password) is incorrect, an appropriate error message can be generated.

In one application, the system is highly configurable, allowing customization by the user including, but not limited to, the GUI interface, the data fields contained with a record, and the number of users who have access to the database. In another embodiment, the invention allows for a quick query of the database to retrieve and display the data related to either an alias or a sensitive data identifier. The system determines the contents of the display through the use of user profile data or by user selections made via a user interface. Depending upon the configuration, the display may show the alias, the encrypted sensitive data element, the unencrypted sensitive data element and other related data. In another embodiment, the system receives either a sensitive data element or an alias as input and provides only the corresponding alias or sensitive data element respectively.

The system also allows the user to search the database for data other than the aliases or sensitive data elements. The results of the search may include the aliases or sensitive data elements related to the search. The system is configurable to display the aliases, the encrypted sensitive data element, the unencrypted sensitive data element, or any combination of aliases and data elements.

The system can be configured to record logs of user activities, such as access attempts related to the sensitive data elements. The system may use these logs for generating a log report that can be used to detect fraudulent accesses and prevent future fraudulent accesses. The type of information stored in log reports varies according to the specific application but may include user ID, event type, time, success/failure indication, IP or Mac address, or account alias.

Where large amounts of sensitive data need to be processed (e.g., conversion of an existing database, modification of the existing key, and merging of another database), it may be beneficial to move the data to an alternate location for processing. For example, a separate database and processing unit could perform the processing, and upon completion of the processing, the data would be sent back to the originating database. A similar method involves storing the aliases and encrypted sensitive data identifiers in separate databases. This method reduces the impact of processing the sensitive data identifiers upon the use of the aliases and other data.

In one embodiment, a computer-based system generates a hash value for each sensitive data identifier or encrypted sensitive data identifier. The system uses this hash value for searching, sorting, and similar database-related processes. For instance, the hash value may represent alphanumeric, numeric, or other limited values. The hash value may also represent a compression of the sensitive data identifier. Additionally, the system may format the hash value further by using another hash algorithm, such as first using Secure Hash Algorithm (SHA-1) and then using Media Digest Algorithm (MD5). Once the hash value has been created, a database application may use the hash value when accessing the database. For example, to search for a sensitive data identifier in the database, the system determines the sensitive data identifier hash value for use in finding records that correspond to the hash value. This method can be particularly beneficial when large amounts of data are accessed during initialization or bulk modification of the database and also can increase the security of the database-related processes. This hash creation method is useful to numerous applications, including applications outside of data aliasing.

In another embodiment, the system can store the aliases and related data in one database while storing the sensitive data identifiers in another database. Using this method, the database may contain file records composed of several types of information that can be separated into different fields of data, of which one or more fields may be a sensitive data identifier or alias. The system can configure one database to store the records with the sensitive data identifiers as a field, while the other database is configured to store the aliases in a similar field. This method of implementing two databases allows the access requirements for each database to be controlled separately.

According to another example embodiment, a user can select a user identification and password for accessing the database. A computer-based system converts the user identification and password to an encrypted file format (e.g., an encrypted XML file or similar format). The user provides the encrypted file to a third party (person or computer-based application) that in turn provides the file to a database management system that is capable of decrypting the file. The database management system (computer-based application or person) uses the decrypted file for configuring the secure access settings of the database during, for example, installation of a database management system. Alternatively, the third party may use the encrypted file after installation to modify the secure access settings of the database. The system then uses the user identification and password to access the database. The user is then able to access the database independently of the database management system using the user identification and password the user originally provided. Additionally, the user and others with appropriate access privileges can access the database through the database management system.

Turning now to the figures, FIG. 1 shows a system for secure storage and utilization of sensitive data elements, according to an example embodiment of the present invention. FIG. 1 contains data handling blocks 110 to 110N, data sources 126 to 126N, authorized applications 102 to 102N, and standard applications 104 to 104N. Numerous environments are envisioned for implementing the system of FIG. 1.

Data sources 126 to 126N supply data set 124. Data set 124 can consist of data related to a variety of different activities, including sales data, financial services data, medical data, census data, and inventory data. Often data set 124 contains sensitive data elements that require appropriate security measures. Unless otherwise stated, sensitive data elements, as used herein, include numbers, letters, symbols, or other representations. Data interface 120 is capable of distinguishing sensitive data 112 from other data 122. In one embodiment other data 122 may be stored in database 118, while sensitive data 112 has additional operations performed upon it. In another embodiment, other data 122 can be encrypted before storage in database 118. Database 118 is shown as a single database; however, several different configurations are possible, such as using several distinct databases containing different types of data, or using several databases containing the same types of data.

Data interface 120 provides the sensitive data 112 to sensitive data control 116. Upon receipt of sensitive data 112, sensitive data control 116 determines if the sensitive data is encrypted. If the sensitive data 112 is encrypted, sensitive data control 116 encrypts the data. In some instances, the encryption requires obtaining a key from either the data source 122 or authorized application 102. In other instances, the decryption can be performed using an external decryption module. Using a third possibility, the data can be decrypted using a decryption scheme that does not require external input. These alternate methods allow the user of the invention flexibility in controlling the method of encryption for the sensitive data prior to being provided to data handling 110. After sensitive data 112 is decrypted, or if sensitive data 112 was not initially encrypted, sensitive data 112 is encrypted by sensitive data control 116.

In addition to encryption, the sensitive data 112 is associated with aliases generated by sensitive data control 116. In one embodiment, the aliases are generated using a random generation scheme and thus are independent of the sensitive data 112. Other alias generation schemes may be implemented to generate aliases that are independent from sensitive data, such as sequential aliases, time based aliases, or aliases selected from an independent list. Sensitive data 112 typically consists of a set of sensitive data elements, and the sensitive data elements are associated with the aliases. The encrypted sensitive data and associated aliases are then stored in database 118.

Database 118 is accessible for use by, for example, applications 102 to 102N and 104 to 104N. In one embodiment, aliases 114 are available for use in several instances where sensitive data 112 is not available, as shown by the distinction between authorized access 106 and standard access 108. For example, many health risks are monitored using statistical analysis. The health risks are found by an analysis of multiple types of personal data that often include personal identification data, such as social security numbers, telephone numbers, addresses and other confidential information. When sensitive data elements are used, the application should implement sufficient security precautions. In order to reduce the necessary security precautions/risks, these applications (and other applications) can perform the data analysis using aliases 114 in place of the sensitive data elements 112. In some instances, however, it may still be necessary to use the sensitive data elements 112; therefore, users with authorized access (management or security personnel) are allowed to view sensitive data elements 112 through authorized access 106.

When authorized application 102 uses sensitive information 112, sensitive data control 116 converts the sensitive data to an unencrypted form for use by authorized application 102 and back to an encrypted form for storage in database 118. For instance, authorized application 102 may request sensitive data 112 from database 118. Sensitive data control 116 decrypts the encrypted sensitive data 117 and provides the sensitive data 112 to authorized access 106. Authorized application 102 then modifies portions of sensitive data 112 (or other related data) and provides the modified data to authorized access 106. Sensitive data control 116 encrypts the sensitive data and stores the encrypted sensitive data 117 in database 118.

Numerous other implementations are envisioned with these components. For example, data sources 126 to 126N may be any number of locations or only a single location. Thus, the data sources 126 to 126N might correspond to cash registers in multiple stores or to computers used in Internet sales. Similarly, data handling blocks 110 to 110N may be either a single location or multiple locations. It is also possible that the entire system depicted in FIG. 1 could be located at a single location. In another embodiment, applications 102 to 102N and 104 to 104N may provide all the data used by data handling blocks 110 to 110N eliminating the need for data sources 126 to 126N.

Figure 2:
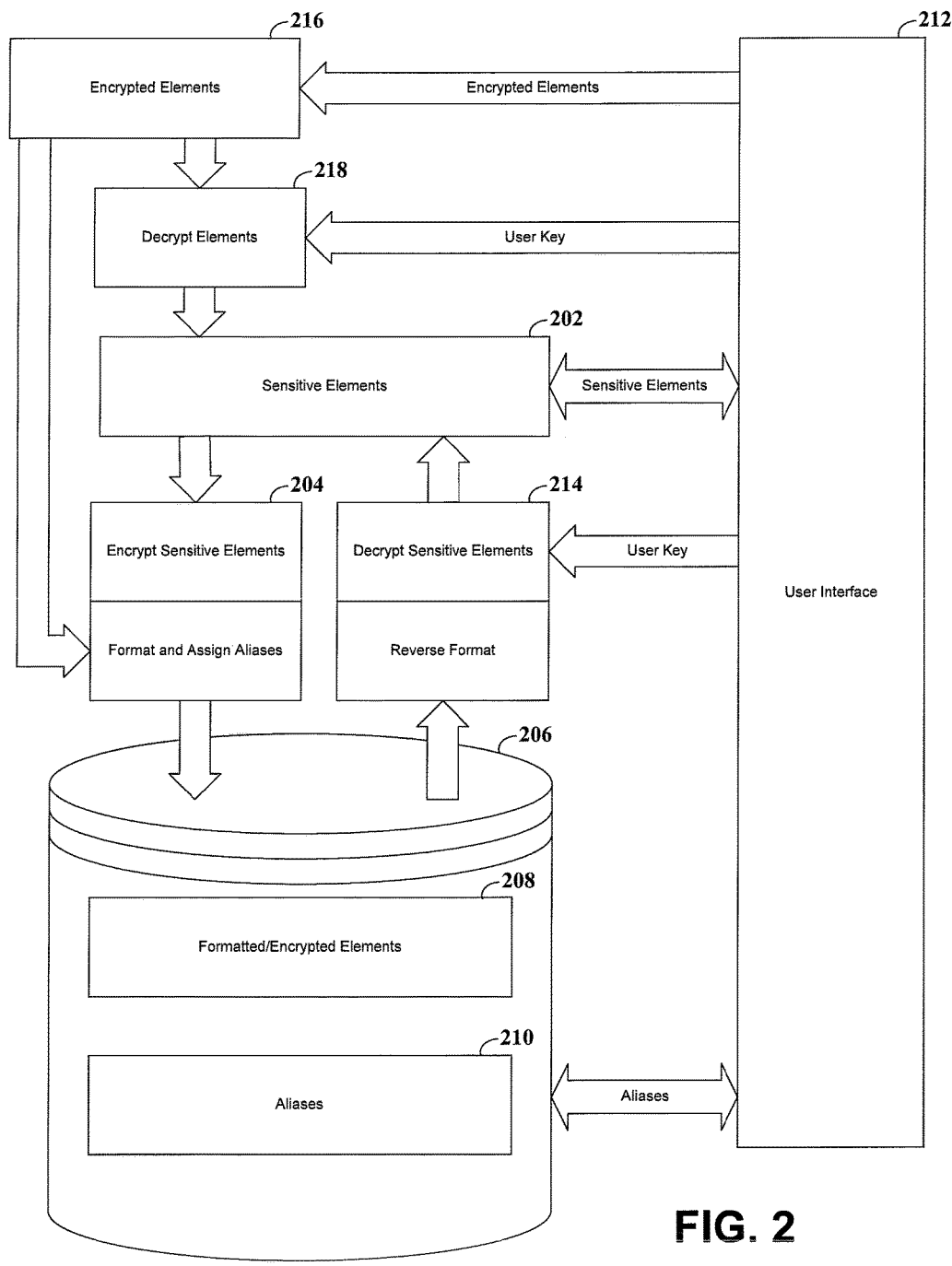
FIG. 2 is an example embodiment of block 110 of FIG. 1.

FIG. 2 shows an example embodiment of data handling block 110 (as implemented by a computer-based system) for storage and utilization of sensitive data, as well as for providing access to aliases representing sensitive data. The sensitive identifiers and alias identifiers are accessible through user interface 212. The user interface may be implemented as a single software interface, multiple software interfaces, or through a number of computer hardware interfaces or circuits. Based upon the access requirement rules, user profiles or other factors, the user interface may provide the aliases or sensitive identifiers for use by, for example, another computer-based system.

In one embodiment, encryption block 204 and decryption block 214 are implemented with a single device capable of both encryption and decryption of data. In other embodiments, encryption block 204 may be implemented using multiple devices (e.g., one or more for encryption and one or more for decryption). User interface 212 can also be implemented using one or more devices. The combination of user interface 212, encryption block 204, and decryption block 214 may be implemented as a single device or a number of device combinations.

User interface 212 serves several purposes. One purpose is the collection of data, some of which may be sensitive data. The data collected may take many different forms and can be collected using any number of methods. For example, the data may include personal identification information relating to financial accounts that are collected for statistical analysis, or alternatively, the personal data may be collected from confidential surveys.

The arrangement of FIG. 2 is capable of accepting the sensitive information in two forms: encrypted (block 216) or non-encrypted (block 202). When the arrangement receives the sensitive information in an encrypted form, the arrangement decrypts the data at block 218. Block 218 may be implemented using several methods. For instance, the decryption algorithm may be implemented without passing the decrypted information through user interface 212 where block 218 contains the necessary decryption algorithm and, if necessary, requests the key for decrypting the information from user interface 212. Some methods of encrypting data implement a key that changes for each set of encryption data (e.g., where the key is based upon the time of encryption). Thus, it is sometimes necessary to retrieve a key for each piece of encrypted data. Using another method, the decryption is performed upon the data after it is passed through user interface 212. This method permits the user to maintain the functionality of decryption block 218 independent of the FIG. 2 arrangement. While user control of the key provides the user with flexibility, user control also introduces the possibility of user error. For example, if the user provides the wrong key through user interface 212, the output of decryption block 218 would be unusable. This is particularly troublesome when performing operations on large amounts of data, such as when the encryption key is changed by the user. Thus, one embodiment of the current invention verifies that the key entered by the user matches the key that was used to encrypt the data. This may be accomplished by a number of different methods, such as storing an encrypted version of the key or a hash value of the key. The stored version of the key is then compared to the encrypted version or hash value of the subsequently entered key.

Using yet another method, the encrypted data may be passed directly to the formatting stage of block 204. This method may be implemented, for example, in situations where the encryption and decryption algorithms at blocks 204 and 214 correspond to the algorithm originally used in providing the encrypted data 216. In some instances, the system also stores the encryption key for the sensitive data for future use in the decryption of the sensitive data.

When sensitive data 202 is collected from user interface 212 or decryption block 218, the data is first modified by encryption block 204 using a suitable encryption scheme. Several encryption schemes use a key to both encrypt and decrypt data. This key can be supplied through the user interface 212. The control of the key through user interface 212 permits the user to maintain flexibility in how the data is encrypted if, for example, the user determines that the key should be changed for security or other reasons.

Often it is necessary that the encrypted data be formatted to facilitate data storage, manipulation, and display. For example, if AES cryptography is used, a binary string is generated that is not easily read or manipulated. This binary string can be converted to American Standard Code for Information Interchange (ASCII) or a similar format using a number of known methods (e.g., uuencode and base64).

Block 204 also generates alias 210 for association with sensitive data 202. Typically the alias is randomly generated, but it also can be generated by other means, such as a sequential generation or by creating a hash value of the sensitive data. The alias and encrypted data is then stored in database 206. In an example embodiment, the format of the alias is configurable by the user of the invention. In another embodiment, the alias has the same format as the original sensitive data. For example, if the sensitive information represents sensitive data elements and the sensitive data elements are sixteen digits long, the alias will also be sixteen digits.

After the encrypted data and the alias are generated, they can be stored in database 206 for use through user interface 212. Typically, when user interface 212 requests data, the database supplies alias 210 instead of encrypted data 208. In this manner, database 206 can be used without supplying the original sensitive data 202 or the encrypted data 208. For example, where the database contains sensitive data elements, the database can be searched and analyzed using the alias instead of the actual sensitive data elements.

In one embodiment, user interface 212 can request the original sensitive data 202. Typically, user interface 212 limits access to the original sensitive data through any well known authorization techniques (e.g., password protection). When there is an authorized request for sensitive data 202, database 206 sends the encrypted data 208 to block 214. At block 214 the encrypted data has the formatting and encryption of block 204 reversed resulting in the original sensitive data 202. This data is then sent to user interface 212.

In an example embodiment, an alias is provided through user interface 212, and the associated encrypted data is requested. In this example, the data stored in database 206 indicates the encrypted data that corresponds to the requested alias using, for example, a cross-reference table. The corresponding encrypted data is provided to block 214 where the sensitive data is recovered by formatting and decrypting the data. In another example of a request involving sensitive data, the sensitive data is entered by the requestor and used to determine the corresponding alias. The entered sensitive data is encrypted and formatted using block 204. The database is searched for any information matching the resulting encrypted and formatted data. If a match is found, the alias indicated by the database as corresponding to the matched data is provided to the requestor.

For security and other reasons, it can sometimes be necessary to change the encryption key used to create the encrypted data stored in the database; for example the user may supply a new key or a new encryption algorithm (or both), and all new data will be encrypted using the new key or algorithm. In addition, all the existing encrypted data can also be encrypted using the new key without assigning new aliases to the existing data. In one embodiment, the new encryption process allows for recovery of the original values in the event the new encryption process fails to complete properly. The present invention also allows for the existing data (encrypted data 208) to be encrypted using the new key or algorithm without changing the correlation between the existing data and the alias 210. Therefore, an external application of the database using the alias 210 often does not need to be updated when the encryption is changed. This method of modifying the encryption used is discussed below in more detail.

Figure 3:
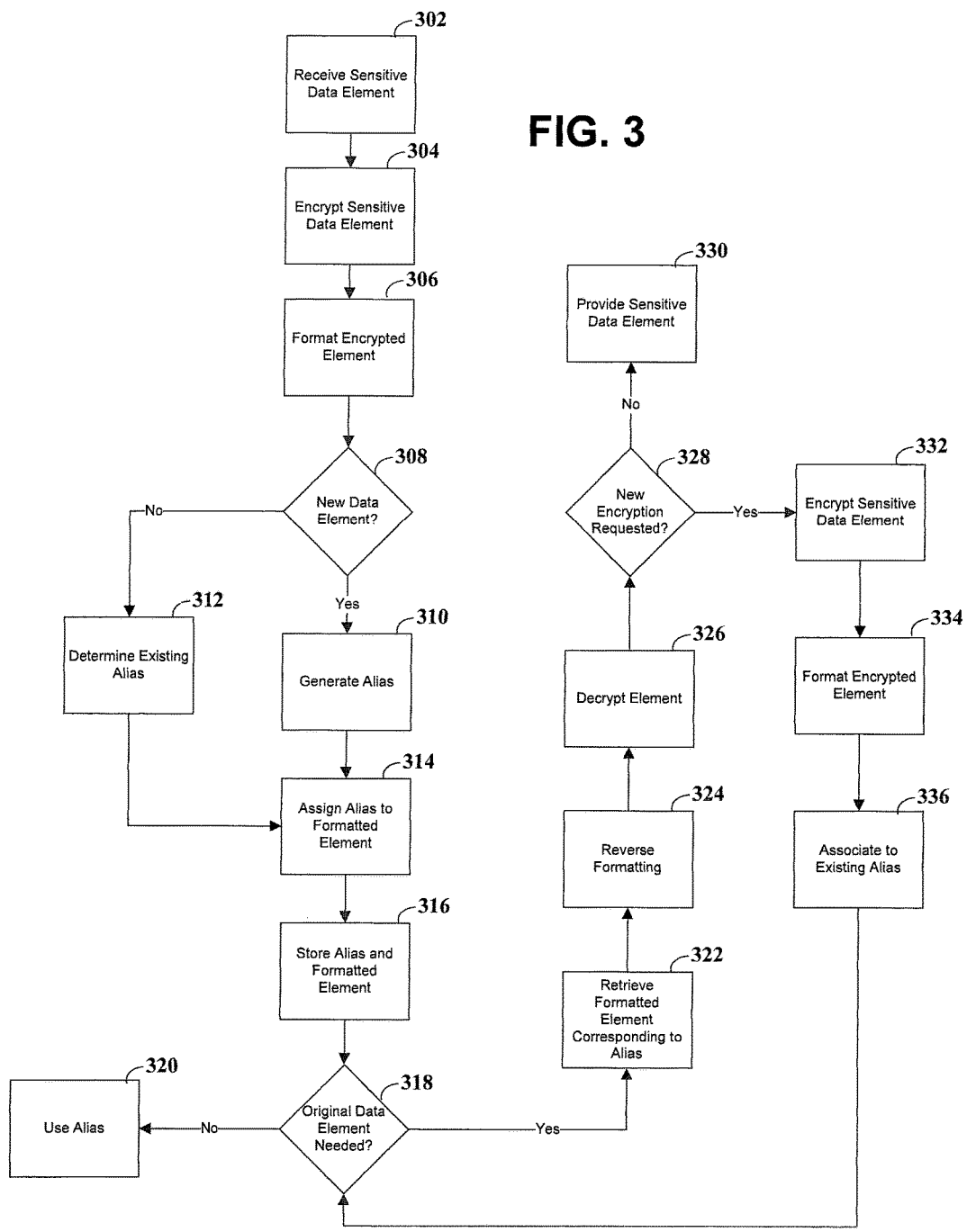
FIG. 3 is a flow diagram for storage and utilization of sensitive data, according to an example embodiment of the present invention.

FIG. 3 is a flow diagram according to another example embodiment of the present invention. Sensitive data elements are received at block 302. In an alternate embodiment, the sensitive data elements can first be received in an encrypted form and decrypted by the method discussed in relation to FIG. 2 blocks 216 and 218 prior to block 302. In either case, the sensitive data elements are subsequently encrypted at block 304. As mentioned above, this encryption can be implemented using a number of different encryption algorithms. In one embodiment, the encrypted sensitive data elements from block 304 are formatted at block 306. An example implementation of blocks 304 and 306 uses AES encryption at block 304 and uuencode formatting at block 306.

At block 308 the sensitive data element is checked against previously stored sensitive data elements. If a match is found between the current sensitive data element and a stored sensitive data element, the alias for the matching stored sensitive data element is used for the current sensitive data element, as shown in block 312. If no match is found, a new alias is generated at block 310. The new alias may be randomly generated, or it may be provided using other methods such as sequential generation. The aliases provided can be of a format that is the same or similar to the original sensitive data element, or they may have an entirely new format. In one embodiment, a portion of the sensitive data element received at block 302 may be used as a portion of the alias; for example, a portion of a credit card number identifying the financial service provider may be used as part of the alias. This allows the financial service provider to be identified from the alias. Other data may also be maintained by similar methods depending upon the configuration of the alias. After the new or existing alias is assigned at block 314, it is stored along with the alias at block 316.

Decision block 318 is based upon whether an access to the database involves the original sensitive data element or only the alias. If an alias is required, it is supplied at block 320. Often, access to the alias is allowed in instances where the access to the original sensitive data element is restricted. Numerous methods involve accessing an original sensitive data element. One such method is to provide an alias associated with the original sensitive data element being requested. Another method is to access sensitive data elements associated with other data (e.g., all sensitive data elements received on a certain day or all sensitive data elements that correspond to a particular person). Yet another method involves changing the encryption of the stored sensitive data elements. Using these and other methods, once it is determined what formatted data is being requested, the formatted data is retrieved from the database at step 322.

Next, the formatted data has the formatting of block 306 reversed in block 324. From block 324, the sensitive data element is decrypted at block 326. If a key was provided for encrypting in block 304, the key can also be provided for use at block 326. The result of the decryption of block 326 is that the original sensitive data element is available for use.

Decision block 328 determines whether the requested purpose is to change the encryption of the sensitive data element. If the purpose is something other than changing the encryption, the sensitive data element is provided to the requestor at block 330. If, however, the purpose is to change the encryption of sensitive data element, the sensitive data element is encrypted using the new algorithm/key at block 332. The encrypted sensitive data element from block 332 is then formatted at block 334. The formatting may be the same as the formatting performed at block 306, or a new formatting may be implemented. Block 336 maintains association between the sensitive data element and its alias. Thus, this method allows the sensitive data element encryption to be modified without modification of the alias. Accordingly, applications that use the alias (block 320) can continue to use the same alias even when the encryption of a sensitive data element is modified.

Figure 4:
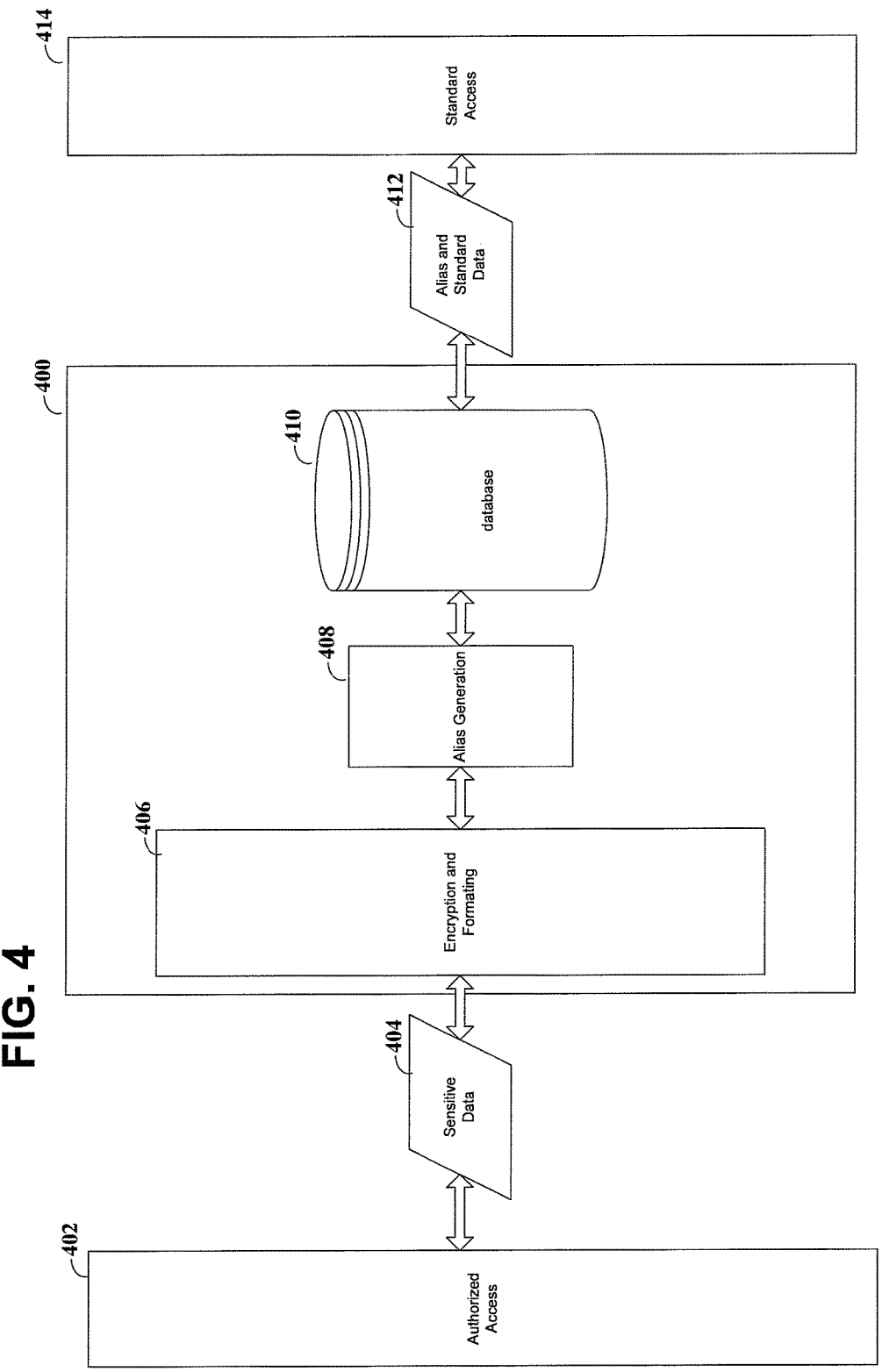
FIG. 4 is an arrangement implementing secure access and storage of sensitive data, according to an example embodiment of the present invention.

FIG. 4 is an arrangement implementing secure access and storage of sensitive data. FIG. 4 contains authorized access 402, standard access 414, and arrangement 400. Authorized access 402 represents access requests that are restricted through proper security measures. Standard access 414 represents access requests having different, if any, restrictions from those implemented for authorized access 402. Arrangement 400 represents the process for storing and accessing sensitive data, as well as for creating and accessing aliases.

Authorized access 402 involves access to the sensitive data 404, and therefore, involves a level of security to restrict access that may be implemented using varying levels of sophistication. A simple security restriction may require a password to allow access. More elaborate measures may include biometric security systems, access cards, or physically limiting access to the arrangement 400.

Standard access 414 involves access to the alias 412 and data other than sensitive data 404, and therefore, does not always involve the same level of security implemented in authorized access 402. In fact, it is possible that access to the alias 412 can be unsecured. Even if the standard access 414 does involve some level of security, it may be of a different level than authorized access 402. Another possible distinction between the accesses involves the set of users who are granted access to each. For example, security personnel might be granted access to both the authorized access 402 and the standard access 414, while inventory personnel are only granted access to the standard access 414.

As can be seen from FIG. 4, the alias can be directly provided to a requestor because the alias can be stored in a non-encrypted form. Access to the sensitive data, however, involves a decryption for reading the data and an encryption for writing the data, as shown in block 406. In some embodiments, the data is also formatted in block 406.

Block 408 generates and assigns aliases to the encrypted data received from block 406. When sensitive information is requested from the database 410 using aliases, block 408 can also determine the sensitive data that is associated with the provided alias. The sensitive data is then decrypted at block 406 and provided to authorized access 402.

For additional information regarding implementations of a database management system, reference can be made, for example, to U.S. Provisional Patent Application No. 60/763,048 filed on Jan. 27, 2006 and entitled: "Sensitive Data Aliasing and Implementations Thereof" including its appendices A-D; to U.S. patent application Ser. No. 11/372,736 (U.S. Pat. No. 7,873,577) filed on Mar. 10, 2006 and entitled: "Sensitive Data Aliasing for Transaction-Card and Other Applications" to Duhaime et al; and to U.S. Pat. No. 6,847,393 issued on Jan. 25, 2005 and entitled: "Method and System for Monitoring Point of Sale Exceptions."

The various embodiments described above are provided by way of illustration only and should not be construed to limit the invention. Based upon the above discussion and illustrations, those skilled in the art will readily recognize that various modifications and changes may be made to the present invention without strictly following the exemplary embodiments and applications illustrated and described herein. For instance, such changes may include assigning multiple aliases to the same sensitive data element. Other changes may include implementing more than one database and storing the sensitive information in one database and the alias in another database. Such modifications and changes do not depart from the true spirit and scope of the present invention, which is set forth in the following claims.

What is claimed is:

1. A computerized method of encoding data sets containing sensitive information and generating aliases to represent data elements, the method comprising:
   providing access to sensitive personal data sets in a storage device, wherein the sensitive personal data sets include encrypted data elements using an encryption method, wherein the encrypted data elements are used to disguise or hide user-identification information; and
   by operating at least one computer,
      using aliases independent from the data elements to generate an association between the aliases and the encrypted data elements; and
      providing at least two levels of restricted access to the encrypted data elements, including a first level through which authorized users retrieve information from or associated with the sensitive personal data sets but without the user-identification information, wherein the user-identification information is disguised or hidden by way of a first encryption method, and including a second level through which another set of authorized users retrieve information from or associated with the sensitive personal data sets and with access to the user-identification information even though the user-identification information is disguised or hidden by way of the first encryption method, wherein the second level of the restricted access includes carrying out a method of decryption.

2. The computerized method of claim 1, wherein the first level of the restricted access is provided to a set of standard users and includes using the aliases in place of the sensitive data elements to disguise or hide the user-identification information.

3. The computerized method of claim 1, wherein the first level of the restricted access uses the aliases in place of the data elements for a set of standard users, and wherein at least some of the standard users are not included in the other set of authorized users associated with the second level.

4. The computerized method of claim 1, wherein the data elements are stored in a first database and the aliases are stored in a second database, and wherein each of the first and second databases is communicatively coupled to said at least one computer via the two levels of restricted access.

5. The computerized method of claim 1, wherein the second level includes maintaining the association between the aliases and the data elements.

6. The computerized method of claim 1, wherein the second level includes decrypting the data elements and subsequently encrypting the data elements using a second encryption method.

7. The computerized method of claim 1, wherein the second level includes:
   decrypting the data elements and subsequently encrypting the data elements using a second encryption method; and
   maintaining the association between the aliases and the data elements.

8. The computerized method of claim 1, further including tracking and creating a log of activities, including access communications, by at least one of the standard users and the other set of authorized users.

9. The computerized method of claim 1, further including tracking and creating a log of activities, including access communications, by each of the standard users and the other set of authorized users.

10. The computerized method of claim 1, further including maintaining credit card information associated with the sensitive personal data sets.

11. The computerized method of claim 1, further including maintaining user-sensitive medical information associated with the sensitive personal data sets.

12. The computerized method of claim 1, further including maintaining social security information associated with the sensitive personal data sets.

13. The computerized method of claim 1, further including access, corresponding to the first level, for performing a statistical analysis.

14. The computerized method of claim 1, wherein access, corresponding to the first level, is performed for a statistical analysis, through which encrypted forms of the sensitive data elements are associated with aliases, and through which the aliases, or representative information, is used for the statistical analysis independent of any encryption of the sensitive data elements.

15. The computerized method of claim 1, wherein access, corresponding to the first level, is performed for a statistical analysis, through which the statistical analysis is run for medical purposes using aliases in place of patient-identifiers while using both the aliases and the encryption to mitigate risk of the patient-identifiers being fraudulently derived.

* * * * *